United States Patent
Bußer et al.

(10) Patent No.: US 8,259,914 B2
(45) Date of Patent: Sep. 4, 2012

(54) SYSTEM AND METHOD FOR A SECURE LOG-ON TO A COMMUNICATIONS SYSTEM COMPRISING NETWORK CONNECTION AND CONNECTION HANDLING COMPUTERS

(75) Inventors: Jens-Uwe Bußer, München (DE); Steffen Fries, Baldham (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1584 days.

(21) Appl. No.: 11/660,348

(22) PCT Filed: May 11, 2005

(86) PCT No.: PCT/EP2005/052143
§ 371 (c)(1),
(2), (4) Date: Feb. 13, 2007

(87) PCT Pub. No.: WO2006/018329
PCT Pub. Date: Feb. 23, 2006

(65) Prior Publication Data
US 2007/0286365 A1   Dec. 13, 2007

(30) Foreign Application Priority Data
Aug. 13, 2004  (DE) .......................... 10 2004 039 407

(51) Int. Cl.
*H04M 11/00*   (2006.01)
(52) U.S. Cl. ........... 379/93.02; 379/142.05; 379/142.06; 379/265.04
(58) Field of Classification Search ............... 379/88.02, 379/88.17, 93.02, 100.12, 142.05, 265.04, 379/142.06
See application file for complete search history.

(56) References Cited

U.S. PATENT DOCUMENTS
5,586,260 A   12/1996 Hu
6,185,680 B1   2/2001 Shimbo et al.
(Continued)

FOREIGN PATENT DOCUMENTS
DE   102 59 755 A1   7/2004
(Continued)

OTHER PUBLICATIONS

ITU-T, H.235, Telecommunication Standardization Sector of ITU, "Security and Encryption for H-Series (H.323 and other H.245-based) Multimedia Terminals", Series H. Audiovisual and Multimedia Systems, Infrastructure of Audiovisual Services-Systems Aspects, Aug. 2003, pp. i-vii., 1-118.

(Continued)

*Primary Examiner* — Yuwen Pan
*Assistant Examiner* — Yosef K Laekemariam (57) ABSTRACT

In one aspect, communication link established from a communication unit to a communications system. A request message is transmitted from a communication unit to the work connection computer and checked with the aid of a user profile of the communication unit, to verify whether the communication unit has log-on authorization. If the verification of the request message is positive, the request message is forwarded from the network connection computer to the connection handling computer in the form of a modified request message. The modified request message is analyzed by the connection handling computer with the aid of an authentication profile of the network connection computer. Once the modified request message has been positively analyzed and the communication unit has been successfully registered, a response message is transmitted from the connection handling computer to the communication unit.

17 Claims, 4 Drawing Sheets

U.S. PATENT DOCUMENTS

| | | | |
|---|---|---|---|
| 6,229,810 B1* | 5/2001 | Gerszberg et al. | 370/401 |
| 2005/0160289 A1* | 7/2005 | Shay | 713/201 |
| 2005/0169251 A1 | 8/2005 | Busser et al. | |
| 2006/0165226 A1 | 7/2006 | Ernst et al. | |

FOREIGN PATENT DOCUMENTS

| | | |
|---|---|---|
| DE | 10 2004 004 048 A1 | 8/2005 |
| WO | WO 01/05115 A2 | 1/2001 |
| WO | WO 01/19018 A1 | 3/2001 |
| WO | WO 03/039096 A1 | 5/2003 |

OTHER PUBLICATIONS

ITU-T, H.323, Telecommunication Standardization Sector of ITU, "Packet-Based Multimedia Communications System", Series H: Audiovisual and Multimedia Systems, Infrastructure of Audiovisual Services-Systems and Terminal Equipment for Audiovisual Services, Jul. 2003, pp. i-viii, 1-286.

Cysco Systems "Cisco Aironet 1200 Series Access Point Installation and Configuration Guide", Cisco IOS Release 12.2(8)JA, Chapter 10; Configuring Authentication Types, Feb. 2003, p. i-xv, 133-144, http://www.cisco.com/application/_pdf/en/us/guest/products/_ps430/c1679/ccmigration_09186a0080147d84.pdf.

J. Rosenberg, H. Schulzrinne, G. Camarillo, A. Johnston, J. Peterson, R. Sparks, M. Handley, E. Schooler, SIP Session Initiation Protocol, Network Working Group, Request for Comments 3261, Obsoletes: 2543, Category: Standards Track, Jun. 2002, pp. 1-269.

* cited by examiner

SYSTEM AND METHOD FOR A SECURE LOG-ON TO A COMMUNICATIONS SYSTEM COMPRISING NETWORK CONNECTION AND CONNECTION HANDLING COMPUTERS

CROSS REFERENCE TO RELATED APPLICATIONS

This application is the U.S. National Stage of International Application No. PCT/EP2005/052143, filed May 11, 2005 and claims the benefit thereof. The International Application claims the benefits of German application No. 102004039407.5 DE filed Aug. 13, 2004, both of the applications are incorporated by reference herein in their entirety.

FIELD OF INVENTION

The invention relates to a communications system, to a method for logging onto a communications system and to a network connection.

BACKGROUND OF INVENTION

Security mechanisms for a packet-oriented network communication are defined in the ITU standard H.235 (published in ITU-T recommendation H.235, Version 3, "Security and Encryption for H-Series (H.323 and other H.245-based) Multimedia Terminals"). Integrity and authenticity of the registration and signaling messages are ensured in this case inter alia by cryptographic checksums by incorporating a common secret. If an error occurs when checking a cryptographic checksum, the messages, which may also contain address information, are discarded.

In what is known as the "Baseline profile" according to H.235 Annex D, a communication unit and a connection handling computer, which is also called a gatekeeper, authenticate by means of a password which has been registered in advance. In what is known as the "hybrid profile", according to H.235 Annex F, the communication unit and the connection handling computer use digital signatures and certificates when logging-on or registering. To protect the integrity of further messages following successful logging-on, a common secret is dynamically arranged using what is referred to as the Diffie-Helman method during the logging-on procedure.

To check the authenticity of a received message and to verify authorization, the connection handling computer has to fall back on a database in which the user profiles are stored with the pre-administered passwords for H.235 Annex D or with the certificates in the case of H.235 Annex F. This database is conventionally situated in the same IP network as the connection handling computer. Communication units in other IP networks can also log-on if their messages are forwarded to the connection handling computer via a network connection computer.

SUMMARY OF INVENTION

There exists a range of known methods for forwarding messages. The message is forwarded unmodified. This possibility is eliminated if translation of IP addresses (Network Address Translation NAT) has to be carried out at the network boundaries.

In a next method only some of the message, which does not have to be modified, is protected (H.235 Annex D "Authentication only"). This method does not require any additional administration complexity but allows what is known as "man-in-the-middle-attacks".

In a further method the cryptographic checksum is already checked in the network connection computer and then re-calculated. For this purpose the network connection computer requires access to the connection handling computer database or a corresponding copy. This method requires increased administration complexity and protocols for conveying the database information beyond network boundaries.

In a further method authentication and authorization is divided in the case of communication units according to H.235 Annex F. The communication unit is authenticated by the network connection computer, which already has a security link with the connection handling computer, on the basis of a digital signature in the log-on message. The network connection computer thereafter passes a modified message, optionally via additional network connection computers, through to the connection handling computer. Since what is involved here is a modified message, it is provided with a specific identifier (Object Identifier OID). Authorization of the client is finally verified in the connection handling computer by comparing the certificate, sent at the same time, with its database. The response of the connection handling computer is subsequently passed back to the first network connection computer via the chain of network connection computers. This first network connection computer now responds to the request message of the communication unit with a standard conformal response message, the authenticity of which can be checked by the client. In the case of a successful log-on what are known as Diffie-Helman parameters are also exchanged between the communication unit and the first network connection computer in this method. A common secret is generated therefrom, so there is a secure connection between the communication unit and the network connection computer, and therefore with the connection handling computer as well, thereafter. This method is known from German patent application DE 10 2004 004 048.6.

In one method communication units can implement logging onto a communications system with the aid of what is known as WLAN technology (WLAN—Wireless Local Area Network). Access verification is carried out in this connection either by an access computer (access point) or by the access computer and an access management computer (server). However, for registration the communication unit must also know a connection handling computer that follows the access computer or the access management computer, i.e. a user profile of the communication unit must be managed in the connection handling computer. This method is known for example from Chapter 10 of the Cisco Aironet 1200 user manual, see http://www.cisco.com/application/pdf/en/us/guest/products/ps430/c1679/ccmigration_09186a0080147d84.pdf.

These known methods presuppose that each communication unit is administered in the connection handling computer's database. The drawbacks in this connection are that on the one hand increased data traffic is generated between network connection computer and connection handling computer and, on the other hand, there is an increased delay in a communication unit logging onto a communications system as a result of this message traffic, which potentially has to be routed via a plurality of network connection computers.

Moreover in said methods only communication units which have the required security measures, such as digital signatures and certificates and/or passwords, may be logged on at the network connection computer and the connection handling computer. The use of communication units without security measures is not possible in this connection since these would jeopardize the security of the entire communications system.

An object of the present invention is therefore to provide a communications system, a method for logging onto a communications system and a network connection computer which easily and efficiently ensure a high level of security with low administration complexity.

In the communications system comprising at least one connection handling computer, at least one network connection computer that is coupled to the connection handling computer and at least one communication unit that is coupled to the network connection computer, as communication elements, a first database being coupled to the network connection computer and a second data base being coupled to the connection handling computer, the communications systems being configured in such a way that for logging-on of the communication unit with the communications system, a request message is transmitted from the communication unit to the network connection computer, the request message is checked with the aid of a user profile of the communication unit, to verify whether the communication unit has log-on authorization, the user profile being stored in the first database, if the verification of the request message is positive it is forwarded from the network connection computer to the connection handling computer in the form of a modified request message, the modified request message is analyzed by the connection handling computer with the aid of an authentication profile of the network connection computer, the authentication profile being stored in the second database, once the modified request message has been positively analyzed and the communication unit has been successfully registered, a response message is transmitted from the connection handling computer to the communication unit.

As a result of the communications system according to the invention verification of the log-on authorization of a communication unit, which wishes to log into the communications system, is carried out by the network connection computer. This results in a reduction in the complexity in the connection handling computer. The administration of the connection handling computer is also simplified since the connection handling computer only needs to know the authorization profile of the network connection computer, but not the user profile of the communication units connected to the network connection computer.

Moreover, a number of messages, which are required to establish the communication link are reduced, since for example in the case of negative verification of log-on authorization, no response messages have to be exchanged between the connection handling computer and the network connection computer.

If there is preferably forwarding of the modified request message only after positive verification of authentication and authorization of the request message by the network connection computer, communication units can log onto a communications system which boost security measures, such as authentication.

If in a further preferable variant there is forwarding of the modified request message only after previous positive verification of association of the communication unit with a first network, the first network comprising at least the communication unit and the network connection computer, and the first network being secured against unauthorized external access. Communication units can thus log onto a communications system which does not have any security measures.

In an additional embodiment the network connection computer has access protection, so undesired access of a communication unit, which is not in the secure network of the network connection computer, may be prevented.

In an advantageous variant at least two coupled communication elements are connected to each other by a secure connection, so messages can be securely exchanged between these coupled communication elements easily and with little time expenditure.

If in a further advantageous variant the secure connection exists at least between the connection handling computer and the network connection computer, messages can be securely exchanged at least between the connection handling computer and the network connection computer easily and with little time expenditure.

The communication unit and the connection handling computer are preferably allocated to different networks, so the communications system according to the invention can also be produced in networks that are far apart. This also makes it possible to produce the communications system according to the invention in networks which are implemented according to different standards.

In a further variant the connection handling computer is a computer or an additional network connection computer which is coupled to a connection handling computer. This makes it possible for the communications system according to the invention to be produced even if a large number, for example five, of network connection computers are arranged between the communication unit and the connection handling computer.

Charging of message traffic of at least one communication unit is preferably allocated to the network connection computer. The network connection computer can hereby collect separate charging information for each communication unit and, possibly also evaluate it.

In a further preferred embodiment total charging of message traffic of all communication units, which are connected to the network connection computer, is allocated to the connection handling computer. All of the message traffic of all communication units, which are connected to the network connection computer, can be acquired hereby.

The invention also relates to a method for logging onto a communications system, comprising a connection handling computer, a network connection computer coupled to the connection handling computer and at least one communication unit coupled to the network connection computer, as communication elements, a first database being coupled to the network connection computer and a second database being coupled to the connection handling computer, in which a request message is transmitted from the communication unit to the network connection computer, the request message is checked with the aid of a user profile of the communication unit, to verify whether the communication unit has log-on authorization, the user profile being stored in the first database, if the verification of the request message is positive the request message is forwarded from the network connection computer to the connection computer in the form of a modified request message, the modified request message being analyzed by the connection handling computer with the aid of an authentication profile of the network connection computer, the authentication profile being stored in the second database, and once the modified request message has been positively analyzed and the communication unit has been successfully logged-on a response message is transmitted from the connection handling computer to the communication unit.

As a result of the method according to the invention verification of the log-on authorization is transferred completely to the network connection computer. Consequently the complexity and the administration effort of the connection handling computer are reduced. It also makes it possible to bundle administration of the communication units in the network connection computer.

In a preferred variant of the method according to the invention the modified request message is only forwarded after previous positive verification of the authenticity and authorization of the request message of the communication unit by the network connection computer, so with the aid of these security mechanisms logging-on of communication units is made possible even in an insecure network.

In a further preferred variant the modified request message is only forwarded after previous positive verification of association of the communication unit with a first network, the first network comprising at least the communication unit and the network connection computer and the first network being secured against unauthorized external access. The method according to the invention hereby allows even insecure communication units, i.e. communication units which do not have any security mechanisms, to log-on.

The network connection computer is preferably expanded by access protection, so instants of unauthorized access of a communication unit to the communications system may be reliably controlled.

If a secure connection is established in the case of at least two coupled communication elements, the security during transmission between these communication elements may be increased and the complexity of the encrypting of messages reduced.

If, in a preferred variant, the secure connection is established at least between the connection handling computer and the network connection computer, the duration for logging-on of a communication unit may be reduced.

A preferred embodiment is also characterized in that the modified request message is only forwarded if the secure connection exists between the connection handling computer and the network connection computer. This ensures that a log-on message is efficiently forwarded to the connection handling computer for registration.

The invention also comprises a network connection computer with means for executing the method according to the invention, comprising a receiving unit for receiving messages, in particular request and/or response messages and/or profile response message, comprising a transmitting unit for transmitting messages, in particular modified request and/or response messages and/or profile request message, and comprising a processing unit for verifying a log-on authorization of a communication unit, in particular an authentication and/or authorization, on the basis of a request message of this communication unit and for forwarding the modified request message to a connection handling computer once the request message has been positively verified.

The method according to the invention and/or the communications system according to the invention may be advantageously produced by the network connection computer according to the invention.

BRIEF DESCRIPTION OF THE DRAWINGS

Further details and advantages of the invention will be described with reference to FIG. 1 to 8. In detail in which.

DETAILED DESCRIPTION OF INVENTION

Elements with the same function and the same mode of operation are provided with the same reference characters in FIG. 1 to 8.

The embodiments described hereinafter of various communications systems are preferably used for IP-based (IP=Internet Protocol) telephony.

Figure 1:
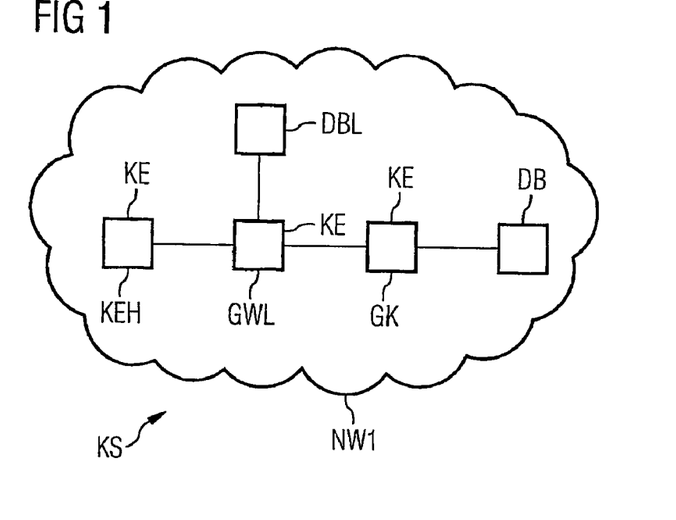
FIG. 1 shows a communications system according to the invention comprising a network according to a first embodiment.

FIG. 1 shows the simplest form of a communications system KS according to the invention in a first embodiment. The communications system KS according to the invention comprises a communication unit KEH, a network connection computer GWL, a connection handling computer GK, a first database DBL and a second database DB, as communication elements KE. The first database DBL, which contains user-specific information of the communication unit KEH, such as a user profile SEC of the communication unit KEH, is, according to the invention, coupled solely to the network connection computer GWL. The user profile SEC includes in particular authorization data, such as certificates of the communication unit KEH. The second database DB is, according to the invention, moreover connected solely to the connection handling computer GK. The second database DB contains user-specific information, such as an authorization profile WEC, about the network connection computer GWL and, once the communication unit KEH has been successfully registered, specific forwarding information (rooting) of the communication unit KEH which, for example, is allocated to the authorization profile WEC. The second database DB therefore in particular also contains authorization data, such as the certificate of the network connection computer GWL. The term "coupled" is taken to mean a direct connection, i.e. this connection between two communication elements is not interrupted by a further communication element. This type of connection may also be produced in that two coupled communication elements are physically implemented in one communication element. Thus for example the first database DBL and the network connection computer GWL can be accommodated in one physical unit, such as on an integrated chip or in a common device. The same applies for example to the second database DB and the connection handling computer GK as well.

In the exemplary embodiment according to FIG. 1 the communication elements. KE, and the first database DBL and the second database DB are allocated to a network NW1. According to the embodiment of FIG. 2 the communication elements KE, the first database DBL and the second database DB can be allocated to different networks NW1, NW2. In the exemplary embodiment according to FIG. 2 the communication unit KEH, the network connection computer GWL and the first database DBL are allocated to a first network NW1. A second network NW2 also comprises the connection handling computer GK and the second database DB. The first and second networks NW1, NW2 are connected to each other by a further network connection computer GW. The further network connection computer GW is partially allocated to the first network NW1 and partially to the second network NW2. A network NW1, NW2 is, for example, taken to mean a communications network.

Figure 3:
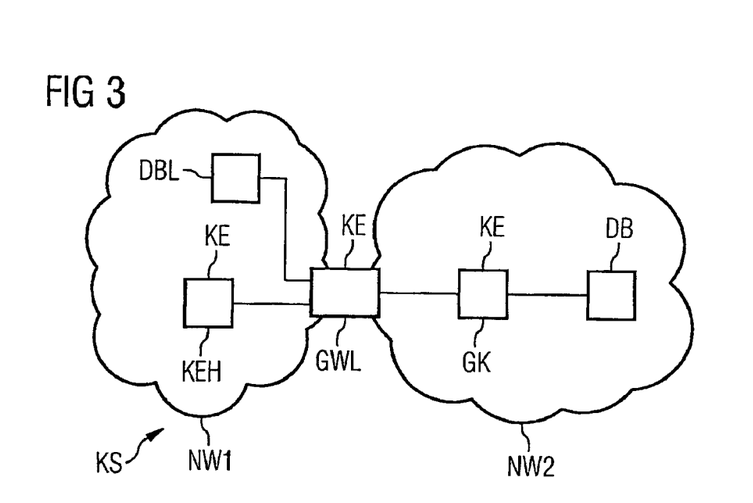
FIG. 3 shows a further communications system according to the invention, the network connection computer comprising access protection and securely separating the two networks.

In a third exemplary embodiment of the communications system KS of the invention according to FIG. 3 the communication unit KEH and the first database DBL are allocated to the first network NW1. The second network NW2 includes the connection handling computer GK and the second database DB. The first and second networks NW1, NW2 are connected to each other with the aid of the network connection computer GWL, the network connection computer GWL being partially allocated to the first network NW1 and partially to the second network NW2.

The respective communication elements KE in the first or second networks NW1, NW2 can operate on the basis of different protocols. Thus for example what is known as a SIP protocol (SIP=Session Initiation Protocol), RFC 3261 is used in the first network NW1, and in the second network NW2 what is known as a H.323 protocol, ITU-T H.323 "Packet-based Multimedia Communication System". The network connection computer GWL or GW, which connects the communication elements KE of the first network NW1 to the communication elements KE of the second network NW2, assumes, for example, protocol implementation and translation, in particular of addresses, formats, codes, etc. The network connection computer GWL or GW, which is also called a gateway, operates on the smallest common layer according to the OSI reference model of the networks to be connected. The network connection computer can be addressed as network nodes and be activated by the first and second networks NW1, NW2.

Figure 2:
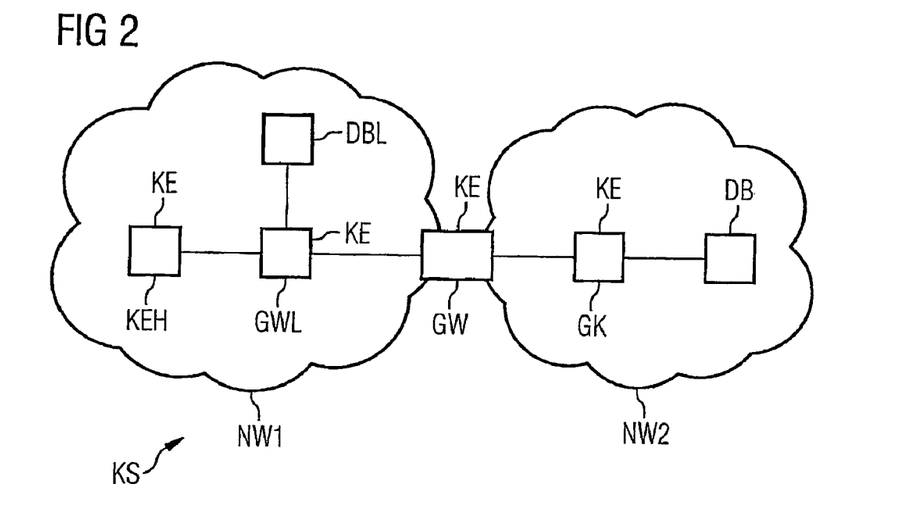
FIG. 2 shows a further communications system according to the invention comprising two networks according to a second embodiment.

Contrary to the diagrammatic view of FIG. 1 to 3, the first network NW1 can comprise a large number of communication units KEH which are connected together and/or to at least one network connection computer GWL, and this in turn to at least one connection handling computer GK. This may be seen in FIG. 8. Here a second and fourth network NW2, NW4 each comprise a connection handling computer GK with a respective coupled second database DB and a respective network connection computer GWL or GW, and a first network NW1 comprises a plurality of communication units KEH and two network connection computers GWL which each have a first coupled database DBL. A third network NW3 has two network connection computers GW or GWL, messages only being transmitted from the first to the second or from the second to the first network in the third network NW3.

The communication unit KEH uses in particular the standard according to H.235 Annex D or H.235 Annex F for establishing a communication link to the communications system KS. Moreover, according to the present invention a communication unit KEH can establish a communication link without using security mechanisms, such as authentication or authorization mechanisms, although according to the invention it is assumed that this communication unit KEH is accommodated together with the network connection computer GWL in a first network NW1 and communication is securely concluded within this first network NW1, i.e. no unauthorized instants of access from outside the network are possible. The communication unit KE can preferably be configured in the form of a mobile radio device to the GSM standard (GSM=Global System for Mobile Communications) or UMTS standard. The communication unit KEH may also be accommodated in a computer unit which is potentially integrated in a portable device. In a further alternative the communication unit KEH can be produced in a fixed network device which is connected to a wired transmission medium, such as a tip-based network or ISDN (ISDN=Integrated Services Digital Network).

The connection handling computer GK, which is also called a gatekeeper, has the task of ensuring authentication and authorization of the network connection computer GWL, GW. The communication unit KEH is also registered with the connection handling computer GK, so for example in the case of incoming telephony calls for the communication unit KEH of the connection handling computer GK, they may be put through to the corresponding communication unit KEH via one or more network connection computers GWL, GK. Contrary to the diagrammatic view in FIG. 1 to 3, there may also be a plurality of connection handling computers GK in one communications system KS.

The method according to the invention when secure communication units KEH are used will be described in more detail hereinafter with the aid of FIGS. 4 and 5. Secure communication units KEH are taken to mean communication units which for exchanging messages, for example with the network connection computer GWL, establish a secure connection VB, i.e. communication units of this type have security mechanisms. Communication units of this type use for example the standard H.235 Annex D or Annex F. To establish a secure connection VB between two coupled communication elements KE each communication element KE requires a personal certificate and the code that corresponds therewith. Each communication element also requires a root certificate with which the personal certificate of each directly adjacent communication element KE has been signed. Based on the first exemplary embodiment of FIG. 1 this means that the network connection computer GWL has a personal certificate ZERT_GWL and the root certificates of the communication unit and the connection handling computer. A respective root certificate is used to check the authenticity of the personal certificate.

Figure 4:
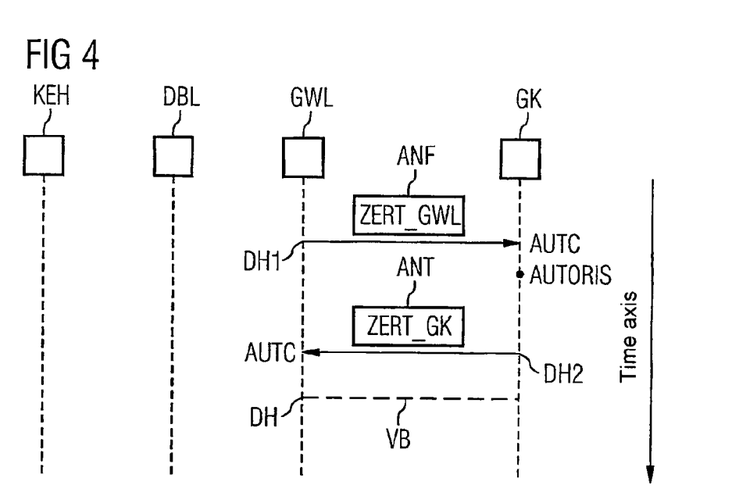
FIG. 4 shows logging-on and establishing of a secure connection using the network connection computer and the connection handling computer as an example.
Figure 5:
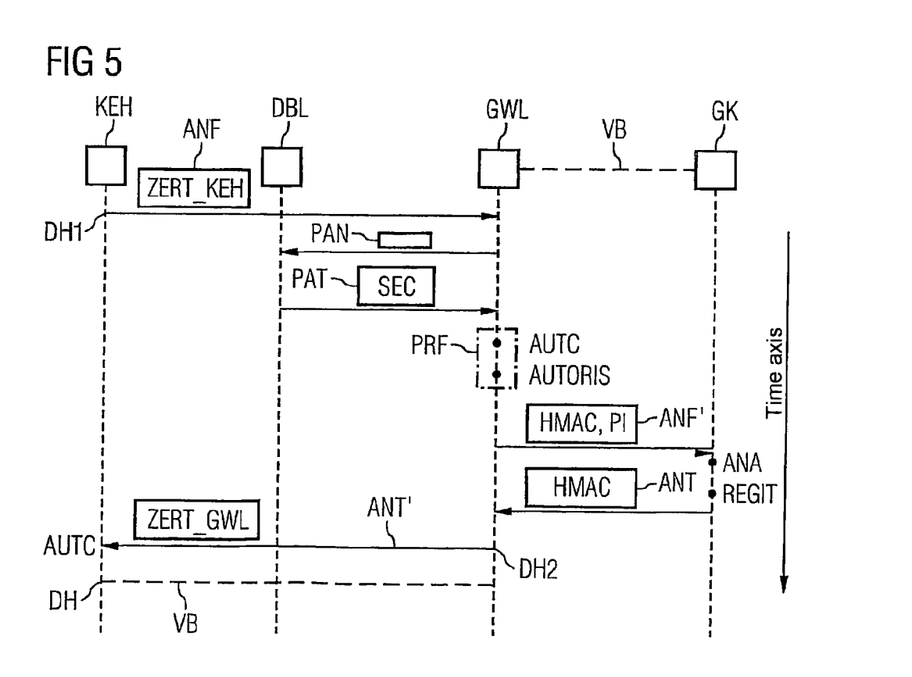
FIG. 5 shows a communication unit logging onto the network connection computer and the connection handling computer, a secure connection being established between the communication unit and the network connection computer.

To establish the secure connection VB, according to FIG. 4 the network connection computer GWL sends a request message ANF to the connection handling computer GK. This request message ANF is signed by means of the personal certificate ZERT_GWL of the network connection computer GWL. This message also contains what is known as a Diffie-Helman halfset, which includes inter alia the public parameters for the Diffie-Helman method (distinguished by reference character DH1). After positive authentication (AUTC) the network connection computer GWL is authorized (AUTORIS) during which the connection handling computer GK checks the second database DB connected thereto for corresponding user-specific entries. If authorization was positive, the connection handling computer GK transmits a response message ANT, signed with its personal certificate ZERT_GK, to the network connection computer GWL, a Diffie-Helman halfset also being transmitted (identified by reference character DH2) to produce a common secret between the network connection computer GWL and the connection handling computer GK. The authenticity (AUTC) of this response message ANT is checked by means of the root certificate of the connection handling computer GK that exists in the network connection computer GWL. It this check was successful, a secret is generated using the Diffie-Helman method (identified by reference character DH), which establishes the basis of the secure connection VB.

If additional secure connections VB are to be established between two communication elements KE, the method is the same as that described. Where there is a secure connection VB between two adjacent communication elements KE in the following figures, this is shown by a broken line.

The existence of the secure connection VB allows transmission of a message between the network connection computer GWL and the connection handling computer GK without the use of certificates. Instead the arranged secret may be used, so checking of a message is simplified and significantly sped up. The HMAC method (cryptographic hash function), by way of example, is used in this connection for authentification and integrity protection of one or more messages.

Logging-on of the communication unit KEH with the communications system KS according to the present invention will be described hereinafter with the aid of FIG. 5. A secure communication unit KEH is assumed in FIG. 5 in this connection. In this exemplary embodiment there is initially only a secure connection VB between the network connection computer GWL and the connection handling computer GK. For logging-on the communication unit KEH sends a request message ANF to the network connection computer GWL. Since a secure connection is also to be established between the network connection computer GWL and the communication unit KEH this request message ANF is provided with what is known as the Diffie-Helman halfset (reference character DH1) and signed by means of the personal certificate ZERT_KEH. After this request message ANF has been received it is checked with the aid of a user profile SEC. The network connection computer GWL can send a profile request message PAN to the first database DBL for this purpose. The first database DBL responds thereto with a profile response message PAT which includes the user profile SEC of the communication unit KEH. The network connection computer GWL thereupon starts a verification (identified by reference character PRF) of the request message ANF. This verification (PRF) includes for example authentication and/or authorization of the request message ANF. If the verification (PRF) of the request message ANF is negative logging-on of the communication unit KEH with the communication system KS is not carried out. In this case the communication unit KEH can be informed about the negative verification (PRF) with the aid of a response message ANT.

If the verification (PRF) is positive the request message ANF is converted into a modified request message ANF'. This modified request message ANF' includes for example an identification feature PI which represents a clear identification of the communication unit KEH. For example this clear identification feature PI is an IP address or a telephone number. This modified request message ANF' is integrity-protected with the aid of the HMAC method owing to the secure connection VB, and is transmitted to the connection handling computer GK.

After receiving this modified request message ANF the connection handling computer GK firstly analyses the validity of the modified request message ANF'. This analysis, see reference character (ANA), is carried out with the aid of the authorization profile WEC of the network connection computer GWL. This authorization profile WEC includes for example a telephone number range which can be used by the connection units KEH connected to the network connection computer GWL. This authorization profile WEC is stored in the second database DB. If this analysis is positive the communication unit KEH is registered (REGIT) in the second database DB of the connection handling compute GK. According to the invention a more extensive check, such as of the authenticity and/or authorization of the communication unit KEH, does not take place in the connection handling computer GK. According to the present invention the connection handling computer GK assumes that authorization and authentication of the communication unit KEH has already been carried out by the network connection computer GWL and is positive.

After successful registration (REGIT) the network connection computer GWL is firstly informed about this positive registration with the aid of a response message ANT. After receiving this response message ANT the network connection computer GWL modifies this response message ANT and forwards a modified response message ANT' to the communication unit KEH. This modified response message ANT' includes what is known as the Diffie-Helman halfset parameter (DH2), this modified response message ANT' being signed with the aid of the personal certificate ZERT_GWL of the network connection computer GWL. After successful authentication (AUTC) of the modified response message ANT' a secret is generated with the Diffie-Helman method (reference character DH) which establishes the basis of the secure connection VB between the communication unit KEH and the network connection computer GWL.

The response message ANT can also include a clear identification feature, such as a telephone number or a user key for the communication unit KEH. An alternative to this consists in a port number, such as port number="25110", for the response message ANT being transmitted by means of the modified request message ANF'. If the response message ANT is then transmitted with this port number, the network connection computer GWL knows that this is the response message ANT for a quite specific communication unit KEH.

Figure 6:
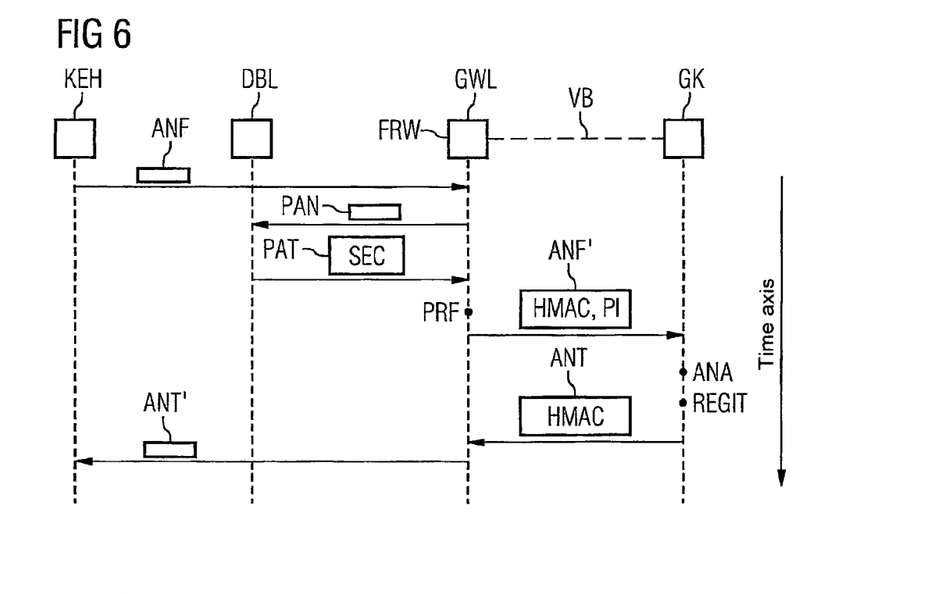
FIG. 6 shows a communication unit logging onto the network connection computer and the connection handling computer, with the communication unit not having any security mechanisms.

FIG. 6 shows a further exemplary embodiment for logging-on of the communication unit KEH, the communication unit KEH being an insecure communication unit. The communication unit KEH firstly sends a request message ANF to the network connection computer GWL. This initially checks whether there is association of the communication unit KEH with its first network NW1. For this purpose the network connection computer GWL retrieves the user profile SEC of the communication unit KEH, for example by means of a profile request message PAN, from the first database DBL. The first database DBL then transmits a profile response message PAT to the network connection computer GWL, it being possible for this profile response message PAT to include the user profile SEC of the communication unit KEH. The network connection computer GWL then carries out the verification (PRF). The result of the verification is for example that the communication unit KEH is not part of the network NW1. In this case the verification (PRF) is negative, so logging-on of the communication unit KEH is stopped. For this purpose the network connection computer GWL sends for example a response message ANT to the communication unit KEH to inform it about the negative verification result. If the verification (PRF) is positive, the request message ANF is forwarded in the form of a modified request message ANF' to the connection handling computer GK. This modified request message ANF' can be protected with the aid of the HMAC method and includes at least the useful identification PI which allows clear identification of the communication unit KEH. After positive analysis (ANA) of the modified request message ANF' and successful registration (REGIT) of the communication unit KEH by the connection handling computer GK, this firstly sends a response message ANT, protected by the HMAC method, to the network connection computer GWL. This forwards this response message ANT in the form of an unprotected, modified response message ANT' to the communication unit KEH.

In an alternative of the method according to the invention the network connection computer GWL merely inquires in its first database DBL whether the first communication unit KEH is part of its network NW1. In this case the first database DBL transmits only the status of the request, such as that the communication unit KEH is part of the network NW1 or not. It is therefore not imperative for the user profile SEC to be transmitted from the first database DBL to the network connection computer GWL.

According to the method of the invention the network connection computer GWL assumes checking of whether the communication unit KEH is authorized to establish a communication link to the communications system KS. To ensure a secure communications system KS either the authenticity and authorization of the request message ANF must be checked by the network connection computer GWL, or the communication unit is in a common first network NW1 with the network connection computer GWL, which network is secure against unauthorized external access, i.e. outside the network NW1. It is particularly advantageous for this purpose if the network connection computer GWL has access protection FWR, so there can be no undesired instants of access from outside the network NW1 into the network NW1. Access protection FWR of this type is also called a firewall. In the embodiment according to FIG. 3 the network connection computer GWL must have access protection FRW of this type if secure logging-on is to be achieved for insecure communication units KEH in the communications system KS. In FIG. 2 by contrast the network connection computer GWL does not have to have access protection FRW for connection of insecure communication units KEH as long as the network connection computer GW comprises such access protection FRW.

Figure 7:
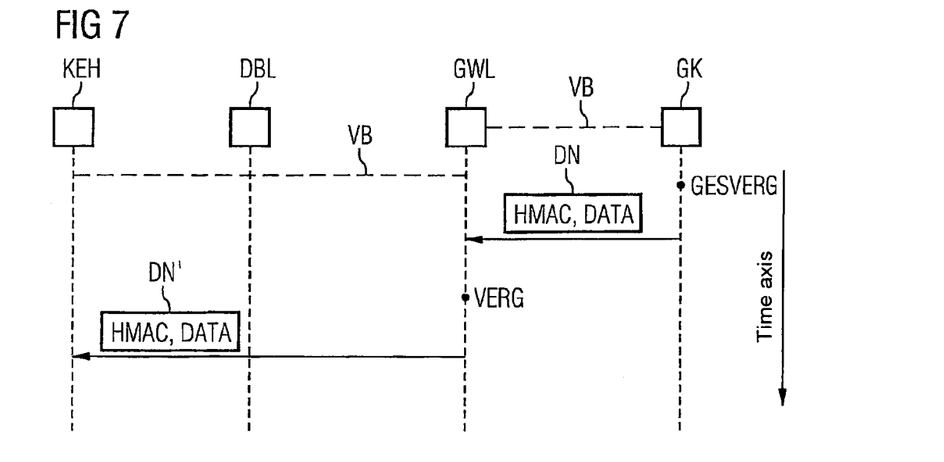
FIG. 7 shows transmission of a data message from the connection handling computer to the communication unit via the network connection computer, this data message being protected by a plurality of secure connections, and total charging information being established in the connection handling computer and charging information being established in the network connection computer.
Figure 8:
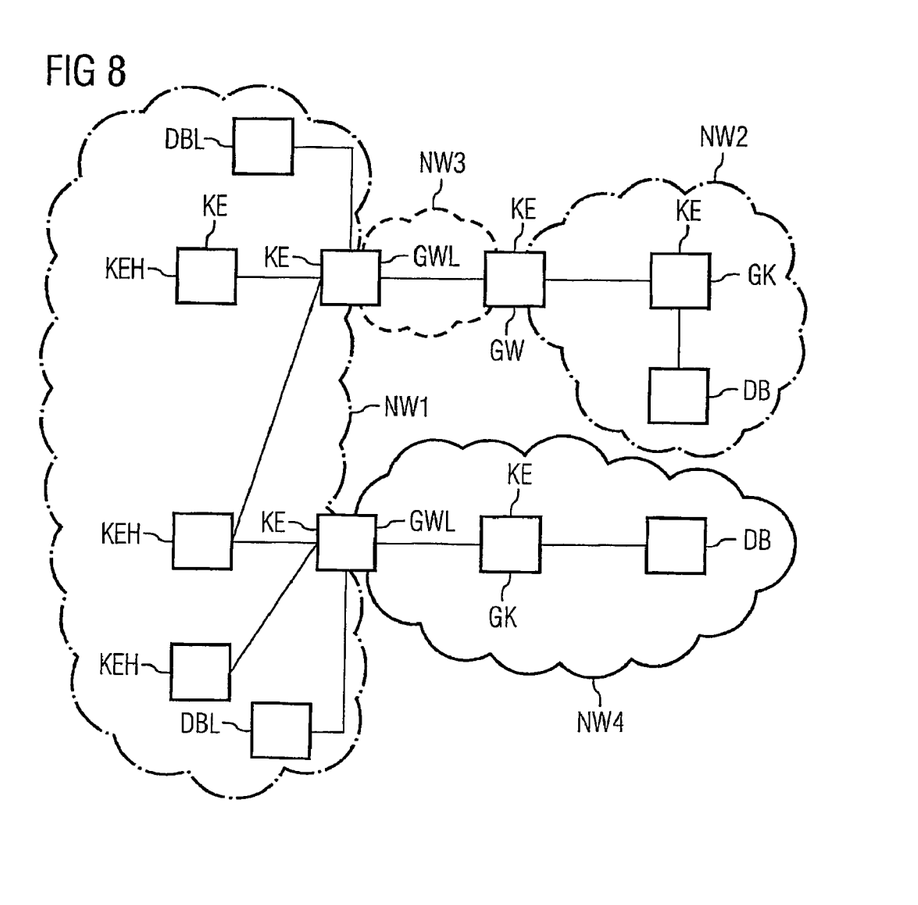
FIG. 8 shows a further communications system according to the invention with a large number of communication units, connections handling computers and network connection computers.

FIG. 7 shows an extension of the method according to the invention, with which method charging will be described in more detail. For this exemplary embodiment it is assumed that there is a respective secure connection VB between the communication unit KEH and the network connection computer GWL and between the network connection computer GWL and the connection handling computer GK. The communication unit KEH has, moreover, already been successfully authenticated and authorized by the network connection computer GWL and successfully registered by the connection handling computer GK. Owing to registration all communication units KEH which can currently be reached via the network connection computer GWL are known to the connection handling computer GK. For example a data packet DATA is to be delivered to the communication unit KEH. For this purpose the connection handling computer GK transmits a data message DN with the data block DATA to the network connection computer GWL. This message is protected with the aid of the HMAC method. The network connection computer GWL thereafter forwards the data message DN in the form of a modified data message DN'. This modified data message DN' contains the data block DATA and is authenticated and integrity-protected with the aid of the HMAC method. For the purpose of charging the network connection computer GWL can implement charging (VERG) for each individual communication unit KEH. Additionally or alternatively the connection handling computer GK may establish total charging (GESVERG) for at least one message transmitted to the network connection computer GWL or received thereby. At a later instant the network connection computer GWL and the connection handling computer GK can forward the collected charging information to a charging point for evaluation.

As a result of the method according to the invention verification as to whether a communication unit is authorized to log onto a communications system is imposed on the network connection computer GWL only. With negative verification the network connection computer GWL declines the request message. On the one hand this reduces the complexity within the connection handling computer GK since it does not have to carry out this verification. On the other hand messages which have to be sent from the network connection computer GWL to the connection handling computer GK for verification of the request message are reduced. Transmission bandwidth is saved hereby. In addition even insecure communication units can establish secure logging on within the communications system as a result of shifting the verification into the network connection computer GWL. Administration of the communication units KEH by the connection handling computer GK is also shifted into the network connection computer GWL. This makes it possible, for example in the case of company networks which allow connection to an additional network with the aid of the network connection computer GWL or GW, for administration of the communication units KEH to be carried out easily and efficiently within this company network.

Additionally only administration of the network connection computer GWL, and not of all communication units KEH, is necessary within the connection handling computer GK, reducing the complexity of the connection handling computer GK hereby.

A further advantage of the present invention is demonstrated by the fact that it is not necessary to change the existing communication protocols within the communication units KEH to implement the method according to the invention. In addition the method according to the invention also makes it possible for different protocols, such as H.323 or SIP, to be used.

The invention claimed is:

1. A communications system, comprising:
a connection handling computer;
a network connection computer coupled to the connection handling computer;
a communication unit coupled to the network connection computer;
a first database connected to the network connection computer;
a user profile of the communication unit stored in the first database;
a second data base coupled to the connection handling computer; and
an authentication profile of the network connection computer stored in the second database; and
wherein a request message is transmitted from the communication unit to the network connection computer, the request message being sent to log on to the communications system;
wherein the network connection computer checks to verify whether the communication unit has log-on authorization, the network connection computer checking the request message by accessing the user profile;

wherein the network connection computer modifying the request message when the request message is verified as having authorization to log on to the communications system, the modified request message having an identification feature that identifies the communication unit;

the network connection computer sending the modified request message to the connection handling computer;

the modified request message is analyzed for validity by the connection handling computer by accessing the authentication profile stored in the second database and utilizing the authentication profile;

the connection handling computer registering the communication unit in the second database when the modified request message is validated;

after successful registration of the communication unit, the connection handling computer sending a registration message to the network connection computer to inform the network connection computer of the successful registration of the communication unit; and the network connection computer modifying the registration message and sending the modified registration message to the communication unit for communicating a successful log on of the communication unit to the communications system.

2. The communications system of claim 1, wherein the modified registration message has data needed to establish a secure connection between the communication unit and the network connection computer.

3. The communications system of claim 2, wherein the data needed to establish the secure connection comprises a certificate of the network connection computer and wherein the communication unit, and the network connection computer are part of a first network secured against unauthorized external access and the connection handling computer is part of a second network.

4. The communications system of claim 1, wherein the connection handling computer does not perform any authorization and authentication of the communication unit.

5. The communications system of claim 1, wherein the network connection computer and the connection handling computer are coupled to each other by a secure connection.

6. The communications system of claim 5, wherein the secure connection also exists at least between the communication unit and the network connection computer after the communication unit receives the modified registration message.

7. The communications system of claim 1, wherein the communication unit and the connection handling computer are allocated to different networks.

8. The communications system of claim 1, wherein the connection handling computer is a computer or an additional network connection computer that is coupled to a connection handling computer.

9. The communications system of claim 1, wherein a charging of a message traffic of the communication unit is allocated to the network connection computer.

10. The communications system of claim 1, wherein a total charging of message traffic of all communication units that are connected to the network connection computer is allocated to the connection handling computer.

11. A method for establishing a communication link to a communications system comprising:
transmitting a request message from a communication unit to a network connection computer, the request message being sent to log on to a communications system;

the network connection computer checking to verify whether the communication unit has log-on authorization, the network connection computer checking the request message by accessing a user profile stored in a first database coupled to the network connection computer;

the network connection computer modifying the request message when the request message is verified as having authorization to log on to the communications system, the modified request message having an identification feature that identifies the communication unit;

the network connection computer sending the modified request message to a connection handling computer of the communications system;

the connection handling computer analyzing the modified request message for validity by accessing an authentication profile stored in a second database coupled to the connection handling computer and utilizing the authentication profile;

the connection handling computer registering the communication unit in the second database when the modified request message is validated;

after successful registration of the communication unit, the connection handling computer sending a registration message to the network connection computer to inform the network connection computer of the successful registration of the communication unit; and the network connection computer modifying the registration message and sending the modified registration message to the communication unit for communicating a successful log on of the communication unit to the communications system.

12. The method of claim 11, wherein the modified registration message has data needed to establish a secure connection between the communication unit and the network connection computer.

13. The method of claim 12, wherein the data needed for the secure connection comprises a certificate of the network connection computer.

14. The method of claim 11, wherein the network connection computer is expanded by access protection.

15. The method of claim 11, wherein the connection handling computer does not perform any authorization and authentication of the communication unit and wherein a secure connection is formed between the connection handling computer and the network connection computer.

16. The method of claim 11, wherein a secure connection is established between the communication unit and the network connection computer and a secure connection is also established between the connection handling computer and the network connection computer.

17. The method of claim 16, wherein the modified request message is sent via forwarding if the secure connection exists between the connection handling computer and the network connection computer.

* * * * *